Patented Aug. 7, 1951

2,563,624

UNITED STATES PATENT OFFICE 2,563,624

METHOD OF CLEANING ISOBUTYLENE POLYMERIZATION APPARATUS

Augustus B. Small and George F. Sellen, Baton Rouge, La., assignors to Standard Oil Development Company, a corporation of Delaware No Drawing. Application August 30, 1947, Serial No. 771,566

4 Claims. (Cl. 260—85.3)

This invention relates to processes and apparatus for the manufacture of isobutylenic polymers and copolymers; relates particularly to apparatus and process for conducting the copolymerization reaction, and relates especially to means for halting the polymerization reaction by a polymer protective agent before a temperature rise occurs in the polymerizate and thereafter clearing adherent polymer from the interior of the reactor walls to recover high grade, protected polymer.

It has been found possible to produce an extremely valuable and commercially important copolymer of isobutylene and a multi-olefin such as butadiene or isoprene or dimethylbutadiene or dimethallyl or myrcene or allo-ocymene or the like; to produce a high molecular weight copolymer having Staudinger molecular weight numbers within the range between about 20,000 or 25,000 and 100,000; which is capable of a curing reaction with sulfur, especially in the presence of a sulfurization aid such as tetra-methyl-thiuram-disulfide; or with para-quinone dioxime or with dinitroso benzene, or the like, to yield a very valuable substitute for, or replacement for, caoutchouc. The manufacture of this copolymer is most conveniently conducted on a large-scale in continuous reactors which are provided with refrigerating jackets containing a refrigerant such as liquid ethylene. Continuing streams of an appropriate mixture of isobutylene and the multi-olefin, together with a separate continuing stream of catalyst solution are delivered to the reactor. A slurry of solid polymer in unpolymerized olefins and diluent is discharged from the reactor through an overflow pipe into a drum containing warm water. The volatiles are vaporized by the warm water and are sent to purifying equipment for recovery and reuse. The solid polymer is converted into a slurry in water from which it is strained out, dried, milled, and shipped for conversion into such articles as inner tubes, proofed fabrics, tires, mechanical goods and the like.

However, the polymerization reaction tends to deposit a portion of the polymer onto the inner walls of the reactor and onto the stirring equipment to yield a relatively heavy, adherent, coating which, on the reactor walls interferes with the transfer of heat from the reaction mixture to the refrigerant, and on the stirrer interferes with the efficiency of stirring. The rate of polymer accumulation on these surfaces and the permissible thickness is such that in from 15 to 50 hours of operation, it is usually desirable to discontinue the polymerization reaction and remove the coating of polymer. It is also found that the molecular weight of the polymer is an important characteristic, since for good strength, high curing rate and easy milling, the Staudinger weight preferably lies within the range between about 35,000 and 60,000, which value must be protected by appropriate breakdown inhibitors in the finished polymers.

The molecular weight is also found to be critically dependent upon the temperature, and a relatively few degrees rise in polymerization temperature very greatly reduces the molecular weight of the products. Accordingly, it is quite important for the production of commercially acceptable copolymer that the temperature be rigorously controlled. However, the accumulation of a layer of adherent polymer on the inside of the reactor reduces the rate of heat transfer from the fluid reactant to the refrigerating jacket to such an extent as to prevent the maintenance of the necessary low temperature in the mixed olefins; and the layer of adherent polymer not only reduces the rate of heat transfer and raises the temperature of the reaction mixture, but since the reaction tends to proceed somewhat more rapidly as the temperature rises, a "reactor runaway" may occur, leading to the production of unusable polymer and the loss of considerable quantities of valuable material. Accordingly when the layer of polymer on the inside of the reactor builds up to the extent that the temperature gradient through the walls and adherent polymer layer becomes more than about 7° to 10° or 12° C., it is necessary to remove the coating from the reactor walls.

It is found that the most satisfactory cleaning procedure for the reactors is to wash them out with "warm feed." That is, instead of cooling the feed containing the mixture of isobutylene, multi-olefin and diluent to the temperature of liquid ethylene, the cooling of the feed is discontinued, and the warm feed stream is sent into the reactor. This causes the temperature to rise substantially above the proper polymerization temperature (the liquid ethylene supply to the reactor cooling jacket may be, at the same time, interrupted and the jacket drained). Under the circumstances, with the stirrer in operation, the temperature of the material in the reactor rises at a substantial rate, the cold contents being diluted by warm feed which, under conditions of vigorous stirring, rapidly solvates, softens; and in part dissolves the polymer in the adherent layer, thereby loosening the adherent polymer layer and removing it from the reactor wall. This procedure cleans the reactor and stirrer of the coating of polymer and since the feed contains no added agents, and the reactor contains considerable quantities of satisfactory polymers, the whole contents of the reactor might well be discharged into the warm water in the flash drum, the unpolymerized material being recovered in the usual manner and the polymer slurried in water and recovered as usual.

In this operation, however, it is found that even though the catalyst stream is interrupted, a sufficient amount of catalyst remains to polymerize a considerable portion of the incoming feed and, warm feed being used, the temperature of polymerization rises rapidly, and large quantities of unsatisfactory polymer are produced, making it necessary to discard the good polymer which has been contaminated by deficient polymer.

According to the present invention there is added to the reactor, soon after the discontinuance of the stream of catalyst, a catalyst inhibiting agent which destroys the potency of the catalyst. Also according to the present invention the catalyst inhibitor is relatively non-volatile so that it does not contaminate the recycle streams of olefin and diluent, and in addition is a breakdown inhibitor or protective agent for the finished polymer. For this purpose the preferred material is phenylbetanaphthylamine.

Equally satisfactory as inhibitors are such substances as hydroquinone and tri-ethanol amine, di-ethanol amine, or the like. The substances are representative of a substantial group of compounds containing amino constituents, with or without hydroxy constituents, which show simultaneously the properties of inactivating the catalyst in the polymerizate mixture and at the same time protecting the molecular weight and the finished polymer against breakdown from heat, storage, or mechanical working.

Thus the invention avoids the production of unduly low molecular weight copolymer during cleaning of the reactor by the addition to the reactor mixture of a catalyst inhibitor which is relatively non-volatile, to prevent contamination of recycle streams; and preferably is also a breakdown inhibitor for the finished copolymer. Other objects and details of the invention will be apparent from the following description.

In practicing the invention a continuous polymerizer is prepared such as is shown in the copending application of J. H. Bannon, Serial No. 448,575, filed June 26, 1942, and now abandoned; or the application of A. D. Green, Serial No. 511,699, filed November 25, 1943, now U. S. Patent 2,463,866; or the application of Green, Lane and Marshall, Serial No. 516,912, filed January 4, 1944, now U. S. Patent 2,399,672; or the application of J. F. Nelson, Serial No. 545,099, filed July 15, 1944. As disclosed in these applications the reactor desirably consists of a steel cylinder having a refrigerating jacket therearound and a circulating device inside; the circulator preferably taking the form of a motor operated propeller stirrer. To the reactor there is then connected a supply of liquid ethylene for cooling the refrigerating jacket. There are also provided means for supplying to the reactor a supply of high purity isobutylene in liquid form and a supply of one or more multi-olefins. The preferred multi-olefin is isoprene, but equally usable multi-olefins are such substances as butadiene, piperylene, cyclo-pentadiene, dimethylbutadiene, or any of its isomers, dimethallyl, myrcene, or the like, it being known that any of the unsaturates having two or more carbon to carbon double linkages and from 4 to about 14 carbon atoms are usable, without regard to the presence or absence of a wide range of substituents, such as the halogens, oxygenated substituents and the like. This mixture is the olefinic feed and the proportion in which the respective mono and multi-olefins are mixed is, in general, a function of the characteristic of the multi-olefin, although in most instances it is preferred to have the isobutylene present in major proportions and the multi-olefin present in minor proportions. However, in some instances the multi-olefin may be present in amounts little more than traces, as small an amount as ½% of multi-olefin (in terms of the amount of isobutylene) yielding a usable copolymer.

There may also be present an appropriate diluent. The commercially preferred diluent is methyl chloride, preferably present in the amounts of from one to five or six volumes, per volume of mixed unsaturates. Other usable diluents are such substances as ethyl chloride, carbon disulfide, the various low boiling paraffinic hydrocarbons such as propane, butane, a pentane, and the like up to about 15 carbon atoms per molecule. Liquid ethylene and liquid ethane may also be used but they are usually refrigerants as well.

For the refrigerant, the preferred refrigerant is liquid ethylene at atmospheric pressure but other usable refrigerants are liquid ethane under suction or vacuum as desired and in some instances solid or liquid carbon dioxide or liquid sulfur dioxide or even some of the fluoro substituted hydrocarbons, especially under suction are also usable; it being merely necessary that the desired low temperature be obtained in the refrigerating jacket.

There is also provided a suitable catalyst supply which commercially is aluminum chloride in solution in ethyl or methyl chloride. Alternatively, however, any of the Friedel-Crafts catalysts disclosed by N. O. Callaway in his article on "The Friedel-Crafts synthesis" printed in the issue of "Chemical Reviews," published for the American Chemical Society, at Baltimore in 1935, in Volume XVII, #3, the article beginning on page 327, the list being particularly well shown on page 375, may be used, preferably in solution in a low freezing non-complex forming solvent.

To be low freezing it is necessary that the solvent have a freezing point below 0° C. and to be non-complex forming it is merely necessary that there shall not separate from the solution upon evaporation of the solvent, a compound between the solvent and the Friedel-Crafts active metal halide catalyst; or that the addition of the solvent in the form of vapor to the catalyst at constant temperature will lead to a substantially continuous change in the composition of the catalyst phase; and to a continuous increase in the partial pressure of the solvent. In general, the catalyst can be recovered unchanged by evaporation of the solvent. Commercially, the preferred catalyst solvent is methyl chloride although ethyl chloride is just about as satisfactory. Alternatively also, the various hydrocarbons may be used especially if such compounds as aluminum bromide or aluminum chlorobromide are used as the catalyst substance.

In the polymerization reaction the reactor is brought down to the desired low temperature by the refrigerating jacket and filled with the cooled feed, either as such or with appropriate modification in composition. When the reactor is full and the temperature is at the proper value, the stream of catalyst is started and the stream of cold feed continued until an overflow of a slurry of solid polymer in unpolymerized unsaturates and diluent (if used) is obtained. The reaction, with continuous flow of feed and catalyst solution, may continue for a substantial number of hours ranging from 5 to 50 or more (runs as long as 150 to 175 hours are occasionally obtainable). However, during the reaction adherent polymer collects on the inner surface of the reactor and on the stirrer, eventually reaching a thickness such that the retarding effect of the coating of polymer on the rate of heat transfer is so great as to give an undesirable high temperature in the reaction mixture; a temperature sufficiently high to produce polymers having lower molecular weight than is desirable.

When this stage in the operation is reached it is necessary to clean the reactor and remove the adherent polymer.

The first step in the procedure is to interrupt and discontinue the stream of catalyst solution. Thereafter, an amount of an inhibitor-inactivator in an amount of approximately one or more grams per gallon of slurry is added to the reactor. This is accomplished by diverting the stream of cold feed through a cartridge containing an appropriate amount of the inhibitor substance. The inhibitor is dissolved by the cold stream and carried by it into the reactor, where it is mixed with the reactor contents. The inhibitor-inactivator substance inactivates the catalyst, preventing any further polymerization reaction, and this procedure is accomplished at a temperature close to the normal polymerization temperature. As soon as the inhibitor has been all delivered to the reactor, the refrigeration is removed from the stream of polymerizate feed, allowing it to warm up. As above pointed out, the desirable inhibitor-inactivator is phenyl beta naphthyl amine, although many other substances are satisfactorily usable.

When the inhibitor has been added and is well stirred in, and the refrigeration upon the feed stream removed, the refrigerating jacket is drained. The stirrer is maintained in operation and the unrefrigerated feed is added through the usual supply connection. The presence of the inhibitor prevents further polymerization and prevents the production of unsatisfactory polymer. The temperature of the reactor contents is raised gradually by the addition of the warm feed; and the maintained stirring yields a scouring action which becomes more effective as the temperature rises. This acts to remove the adherent polymer from the stirrer and reactor walls. The continuous stream of feed maintains the overflow stream, and the original slurry of polymer is gradually displaced and delivered to the flash tank. Simultaneously the scouring off of polymer from the inside of the reactor produces an additional quantity of slurried polymer which likewise is delivered to the flash tank. Also the continuous stream of feed dilutes the inhibitor and eventually washes out substantially all of the added inhibitor.

The slurry of polymer in more or less warm feed is volatilized in the flash tank in the usual manner and the unpolymerized unsaturates and the diluent are sent through the vapor outlet line to the purifying and recycling equipment; and the water slurry of polymer is conveyed to the recovery and drying equipment.

It may be noted that by this procedure no polymer is produced by partly spent catalyst and none is produced at temperatures higher than the normal low temperature. Accordingly no off-grade polymer is produced and no problem of separating satisfactory polymer from off-grade polymer occurs.

Since all of the above mentioned inhibitors are substances of relatively low volatility, none, or non-significant traces only, of the inhibitor are volatilized and carried along with the recycle gases through the recycling equipment and any traces which might be carried along by entrainment or as spray are separated as bottoms in one or another of the purification steps. Accordingly, no problem of contamination of feed or catalyst by the presence of inhibitors in recycled material occurs.

In some instances the reactor may be washed satisfactorily clean merely by the warm feed. In such instances, the refrigeration may be reapplied to the feed stream; and the warm feed to the reactor replaced by cold feed and at the same time a small stream of liquid ethylene may be delivered to the refrigerating jackets, this procedure being conducted as rapidly as compressor capacity will allow, until the desired low temperature is reached; whereupon the catalyst stream may be started and the normal polymerization resumed.

In other instances, especially if the adherent polymer layer is unusually thick or of unusually high molecular weight, washing with warm feed may not be sufficient. In this situation, the reactor contents of warm feed, after washing as well as possible, may be drained from the reactor by any desired procedure, and replaced by warm naphtha of appropriate boiling point; a good grade of solvent naphtha having an initial boiling point of 315° F. and a final boiling point of 415° F. being particularly suitable. Vigorous stirring of the naphtha results in an effective solution of all traces of polymer from the reactor walls. The wash naphtha and dissolved polymer may then be drained from the reactor and sent to recovery processes if desired. The reactor is then filled with appropriate cold feed (after filling the refrigerating jacket with liquid ethylene) and the polymerization is then conducted in the usual manner until adherent polymer reaccumulates, whereupon it is rewashed as above described.

Thus the process of the invention polymerizes an olefinic material by a dissolved catalyst until an undesirably thick layer of adherent polymer has accumulated upon the interior of the reactor, whereupon, before significant temperature rise occurs, the catalyst is inactivated by the addition of a relatively non-volatile catalyst inactivator, which subsequently serves in the finished polymer as an inhibitor to prevent undue breakdown of the polymer and reduction in polymerizate molecular weight under the influence of heat, milling, storage and the like, whereafter the reactor is washed with warm hydrocarbon material, either warm feed or warm naphtha or both, to remove adherent polymer, without the production of polymer by partly spent catalyst or at undesirably high temperatures; and without the loss of satisfactory polymer or the production of poor polymer.

While there are above disclosed but a limited number of embodiments of the process and product of the present invention, it is possible to produce still other embodiments without departing from the inventive concept herein disclosed, and it is therefore desired that only such limitations be imposed upon the appended claims as are stated therein, or required by the prior art.

The invention claim is:

1. In a polymerization process, the steps in combination of mixing together a major proportion of isobutylene, a minor proportion of isoprene and substantial amounts of methyl chloride diluent in a continuing stream, delivering the mixed stream to a refrigerant-cooled, walled-off polymerization zone, simultaneously delivering a stream of aluminum chloride in solution in methyl chloride as polymerization catalyst to the same polymerization zone, discharging therefrom a stream of solid polymer slurry in methyl chloride, continuing the streams of mixed olefins with diluent; catalyst solution and emergent slurry until such an amount of polymer has adhered to the boundaries of the said polymerization zone between zone and refrigerant, to produce a temperature gradient therethrough up toward a value of 12° C.; then discontinuing the stream of aluminum chloride in solution in methyl chloride, diverting the stream of cold mixed olefins through a zone containing a non-volatile amine which is both a catalyst destroying agent and an oxidation inhibitor, whereby there is added to and dissolved in the cold stream of mixed olefins, and thereby added to the reactor contents, an amount of the non-volatile amine sufficient to destroy the catalytic effect of all of the aluminum chloride remaining in the reaction zone, then removing refrigeration from the mixed olefin material and reaction zone, continuing the stream of warm mixed olefin-methyl chloride material until the major portion of polymer adherent to the reaction zone boundaries has been loosened and removed, then re-applying refrigeration to the boundaries of the reaction zone and to the olefin mixture until the contents of the reaction zone are at a temperature much less than 12° higher than the boiling point of liquid ethylene, and then re-delivering a continuing stream of aluminum chloride in methyl chloride solution to the reaction zone; utilizing the amine in the discharged solid polymer as oxidation inhibitor after compounding and curing.

2. In a polymerization process, the steps in combination of mixing together a major proportion of isobutylene, a minor proportion of isoprene and substantial amounts of methyl chloride diluent in a continuing stream, delivering the mixed stream to a refrigerant-cooled, walled-off polymerization zone, simultaneously delivering a stream of aluminum chloride in solution in methyl chloride as polymerization catalyst to the same polymerization zone, discharging therefrom a stream of solid polymer slurry in methyl chloride, continuing the streams of mixed olefins with diluent; catalyst solution and emergent slurry until such an amount of polymer has adhered to the boundaries of the said polymerization zone between zone and refrigerant, to produce a temperature gradient therethrough up toward a value of 12° C.; then discontinuing the stream of aluminum chloride in solution in methyl chloride, diverting the stream of cold mixed olefins through a zone containing a non-volatile amine comprising phenyl betanaphthylamine which is both a catalyst destroying agent and an oxidation inhibitor, whereby there is added to and dissolved in the cold stream of mixed olefins, and thereby added to the reactor contents, an amount of the non-volatile amine sufficient to destroy the catalytic effect of all of the aluminum chloride remaining in the reaction zone, then removing refrigeration from the mixed olefin material and reaction zone, continuing the stream of warm mixed olefin-methyl chloride material until the major portion of polymer adherent to the reaction zone boundaries has been loosened and removed, then re-applying refrigeration to the boundaries of the reaction zone and to the olefin mixture until the contents of the reaction zone are at a temperature much less than 12° higher than the boiling point of liquid ethylene, and then re-delivering a continuing stream of aluminum chloride in methyl chloride solution to the reaction zone, utilizing the amine in the discharged solid polymer as oxidation inhibitor after compounding and curing.

3. In a polymerization process, the steps in combination of mixing together a major proportion of isobutylene, a minor proportion of isoprene and substantial amounts of methyl chloride diluent in a continuing stream, delivering the mixed stream to a refrigerant-cooled, walled-off polymerization zone, simultaneously delivering a stream of aluminum chloride in solution in methyl chloride as polymerization catalyst to the same polymerization zone, discharging therefrom a stream of solid polymer slurry in methyl chloride, continuing the streams of mixed olefins with diluent; catalyst solution and emergent slurry until such an amount of polymer has adhered to the boundaries of the said polymerization zone between zone and refrigerant, to produce a temperature gradient therethrough up toward a value of 12° C.; then discontinuing the stream of aluminum chloride in solution in methyl chloride, diverting the stream of cold mixed olefins through a zone containing a non-volatile amine comprising di-ethanol amine which is both a catalyst destroying agent and an oxidation inhibitor, whereby there is added to and dissolved in the cold stream of mixed olefins, and thereby added to the reactor contents, an amount of the non-volatile amine sufficient to destroy the catalytic effect of all of the aluminum chloride remaining in the reaction zone, then removing refrigeration from the mixed olefin material and reaction zone, continuing the stream of warm mixed olefin-methyl chloride material until the major portion of polymer adherent to the reaction zone boundaries has been loosened and removed, then re-applying refrigeration to the boundaries of the reaction zone and to the olefin mixture until the contents of the reaction zone are at a temperature much less than 12° higher than the boiling point of liquid ethylene, and then re-delivering a continuing stream of aluminum chloride in methyl chloride solution to the reaction zone, utilizing the amine in the discharged solid polymer as oxidation inhibitor after compounding and curing.

4. In a polymerization process, the steps in combination of mixing together a major proportion of isobutylene, a minor proportion of isoprene and substantial amounts of methyl chloride diluent in a continuing stream, delivering the mixed stream to a refrigerant-cooled, walled-off polymerization zone, simultaneously delivering a stream of aluminum chloride in solution in methyl chloride as polymerization catalyst to the same polymerization zone, discharging therefrom a stream of solid polymer slurry in methyl chloride, continuing the streams of mixed olefins with diluent; catalyst solution and emergent slurry until such an amount of polymer has adhered to the boundaries of the said polymerization zone between zone and refrigerant, to produce a temperature gradient therethrough up toward a value of 12° C.; then discontinuing the stream of aluminum chloride in solution in methyl chloride, diverting the stream of cold mixed olefins through a zone containing a non-volatile amine comprising tri-ethanol amine which is both a catalyst destroying agent and an oxidation inhibitor, whereby there is added to and dissolved in the cold stream of mixed olefins, and thereby added to the reactor contents, an amount of the non-volatile amine sufficient to destroy the catalytic effect of all of the aluminum chloride remaining in the reaction zone, then removing refrigeration from the mixed olefin material and reaction zone, continuing the stream of warm mixed olefin-methyl chloride material until the major portion of polymer adherent to the reaction zone boundaries has been loosened and removed, then re-applying refrigeration to the boundaries of the reaction zone and to the olefin mixture until the contents of the reaction zone are at a temperature much less than 12° higher than the boiling point of liquid ethylene, and then re-delivering a continuing stream of aluminum chloride in methyl chloride solution to the reaction zone, utilizing the amine in the discharged solid polymer as oxidation inhibitor after compounding and curing.

AUGUSTUS B. SMALL.
GEORGE F. SELLEN.

REFERENCES CITED

The following references are of record in the file of this patent:

UNITED STATES PATENTS

| Number | Name | Date |
|---|---|---|
| 2,408,007 | Thomas | Sept. 24, 1946 |
| 2,433,025 | Calfee | Dec. 23, 1947 |
| 2,455,665 | Ford | Dec. 7, 1948 |
| 2,462,123 | Nelson | Feb. 22, 1949 |